(12) United States Patent
Abel et al.

(10) Patent No.: US 9,500,528 B2
(45) Date of Patent: Nov. 22, 2016

(54) METHOD FOR MAINTAINING A TEMPERATURE OF A METAL MELT

(75) Inventors: Markus Abel, Kehl-Bodersweier (DE); Alexander Müller, Offenburg (DE); Domenico Nardacchione, Offenburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1106 days.

(21) Appl. No.: 13/390,075

(22) PCT Filed: Aug. 5, 2010

(86) PCT No.: PCT/EP2010/061389
§ 371 (c)(1),
(2), (4) Date: Feb. 10, 2012

(87) PCT Pub. No.: WO2011/018403
PCT Pub. Date: Feb. 17, 2011

(65) Prior Publication Data
US 2012/0140787 A1   Jun. 7, 2012

(30) Foreign Application Priority Data
Aug. 10, 2009 (EP) .................................... 09167540

(51) Int. Cl.
*H05B 7/18* (2006.01)
*G01K 1/12* (2006.01)
*G01J 5/02* (2006.01)
*G01J 5/00* (2006.01)
*G01J 5/04* (2006.01)

(52) U.S. Cl.
CPC .. *G01J 5/02* (2013.01); *G01J 5/00* (2013.01); *G01J 5/004* (2013.01); *G01J 5/029* (2013.01); *G01J 5/04* (2013.01)

(58) Field of Classification Search
CPC .............. G01J 5/00; G01J 5/02; G01J 5/029; G01J 5/04
See application file for complete search history.

(56) References Cited

U.S. PATENT DOCUMENTS

| 6,172,367 B1 | 1/2001 | Fritz et al. |
| 7,140,765 B2 | 11/2006 | Memoli et al. |
| 2004/0178545 A1 | 9/2004 | Cates |

FOREIGN PATENT DOCUMENTS

| DE | 3413589 | 10/1985 |
| DE | 3413589 A1 | 10/1985 |
| EP | 1 440 298 B1 | 4/2008 |

(Continued)

OTHER PUBLICATIONS

International Search Report for PCT/EP2010/061389; mailed Nov. 3, 2010.

(Continued)

*Primary Examiner* — David Angwin
*Assistant Examiner* — Amit K Singh
(74) *Attorney, Agent, or Firm* — Staas & Halsey LLP

(57) ABSTRACT

A temperature of a metal melt in a furnace is maintained after blowing away slag from a surface of the metal melt by the flow of oxygen and switching over from oxygen to an inert gas, such as nitrogen. A measured temperature of the metal melt is accepted as a metal melt temperature only when the inert gas flow is in a laminar state and after the measured temperature has fluctuated by a maximum of 1% over a period of at least 2 seconds.

8 Claims, 2 Drawing Sheets

(56) References Cited

FOREIGN PATENT DOCUMENTS

| EP | 09167540.5 | | 8/2009 |
|----|-----------|----|--------|
| JP | 60-231141 | | 11/1985 |
| JP | 62-228423 | | 10/1987 |
| SU | 152097 | A1 | 11/1962 |
| WO | 2004/083722 | | 9/2004 |
| WO | 2004/083722 | A1 | 9/2004 |

OTHER PUBLICATIONS

Communication by Opponent (in English) dated Jan. 12, 2015 in opposition to corresponding European Patent Application No. 09167540.5, pp. 1-12, forwarded by European Patent Office letter (in German) of Jan. 19, 2015, 17 pp. total.

Galbiati et al., "LMF Continuous Temperature Measurements: Results of First Application", XXXIX Steelmaking Seminar—International, May 2008, pp. 522-533.

"Sytema di Controllo Preparazione Ceste e Acquisizione Pesi Automazione Parco Rottame"; Tenova Melt Shops; Feb. 2009; pp. 1-11.

Office Action in Russian Application No. 2012108727 with German translation.

Execution of Order No. 3806, dated Jul. 4, 2009.

Drawing D1B (6L0B-88653) of 5.4 m diameter E.A.F. with Consteel, by tenova, possibly dated Oct. 7, 2008 or 2009.

Drawing D1C (6L0B-91118-01) of Adattatore (Adapter) KT Sampler, by tenova, possibly dated Mar. 20, 2009.

METHOD FOR MAINTAINING A TEMPERATURE OF A METAL MELT

CROSS REFERENCE TO RELATED APPLICATIONS

This application is the U.S. national stage of International Application No. PCT/EP2010/061389, filed Aug. 5, 2010 and claims the benefit thereof. The International Application claims the benefits of European Application No. 09167540.5 filed on Aug. 10, 2009, both applications are incorporated by reference herein in their entirety.

BACKGROUND

Described below is a method for non-contact determination of a temperature T of a metal melt in a furnace having at least one burner-lance unit, which is fed above the metal melt through a wall of the furnace in a furnace chamber, by a temperature measurement unit assigned to the at least one burner-lance unit. Also described is a device for non-contact determination of a temperature T of a metal melt in a furnace, wherein the device includes at least one burner-lance unit which is fed above the metal melt through a furnace wall of the furnace into the furnace chamber. Also described is a furnace, especially an arc furnace, with such a device.

Furnaces for producing and/or accommodating metal melts are in general use in the steel industry. This type of furnace can generally typically involve an arc furnace, a ladle furnace, a degassing plant or another secondary metallurgy plant. In the production of steel it is important to find out at any given point in time about a temperature of the metal melt. This can be done by contact-based measurement, as a rule by manual temperature measurement and sampling via a lance, or via a non-contact measurement based on electromagnetic radiation emitted by the metal melt.

A device for continuous non-contact measurement of the temperature of a metal melt in a furnace is known from EP 1 440 298 B1. This is equipped with a heat analysis instrument disposed in a lance, which blows inert gas against a surface of a slag located on the metal melt in the furnace or container.

A device for optical analysis of a metal melt in a furnace is known from WO 2004/083722 A1. The device includes a lance with an exit opening for a coherent gas flow which is directed onto the metal melt, a viewing window on the lance which is arranged such that optical data can be captured along the direction of propagation of the coherent gas flow and also an analyzer and a transmitter for transmitting the optical data to the analyzer.

Burner-lance units are also known, which form a combination of a burner and a lance, with such a unit able to be operated in burner mode or in lance mode.

Metallurgical furnaces, especially arc furnaces, generally have burners installed on the furnace wall directed towards the surface of the metal melt in the furnace chamber in order to introduce energy into the metal melt or in order to accelerate the melting process in the furnace. A flame is generated from such a burner in burner mode. In such cases fuel, especially natural gas, oil and such like is burned by mixing it with a combustion gas containing oxygen.

Lances are usually introduced into the furnace chamber locally and frequently only for a restricted time, in order to supply gas for example, such as oxygen for freshening the metal melt, for performing measurements or for taking samples.

As with a known burner, with a burner-lance unit as well, when it is operated in burner mode a flame is generated and energy is introduced into the furnace chamber. The burner-lance unit can however be used a lance, via which a gas flow is blown into the furnace chamber and measurements can be taken at the metal melt, after burner mode is switched off, i.e. the flame is switched off. For this purpose, in addition to the connections for fuel and combustion gas present on a known burner, gas connections for at least one gas to be blown in, in lance mode, are present on a burner-lance unit. The use and modification of a known burner to a burner-lance unit, such that the unit can also be used as a lance, thus means that no additional expense is incurred and no space is required for additional devices.

In lance mode the inside of the burner-lance unit can be used to carry out a temperature measurement on the metal melt by a temperature measuring unit in the furnace chamber. In particular in this case gas to be blown in, in lance mode, is injected at supersonic speed into the furnace chamber in the direction of the metal melt in order to blow away slag forming on the metal melt and expose the surface of the metal melt locally for non-contact temperature measurement. In order to generate a flow of gas at supersonic speed, the burner-lance unit especially features a Laval nozzle in which the gas to be blown is injected at pressure of a few bar.

Standard operation of a metallurgical furnace with at least one burner-lance unit thus usually consists of the following processes:

During the charging of the material to be melted into the furnace chamber the burner-lance unit is operated with a protective flame in order to keep the opening of the burner-lance unit directed towards the furnace chamber free. Subsequently the burner-lance unit is operated in burner mode and the power is increased in stages in order to assist melting of the material in the furnace chamber. As soon as a sufficient amount of metal melt is present, the burner-lance unit is switched over into lance mode and oxygen or gas containing oxygen for freshening the metal melt is injected at supersonic speed into the furnace chamber. During lance mode the protective flame which surrounds the injected gas flow usually continues to burn. As soon as the furnace can be discharged, i.e. the furnace chamber can be emptied, the gas flow is switched off, the burner-lance unit continues to be operated with the protective flame being formed, and the metal melt is removed. Standard operation now begins again with the charging of material to be melted into the furnace chamber.

To carry out non-contact temperature measurement on the metal melt formed, a burner-lance unit can have at least one temperature measurement unit assigned downstream from it, which is arranged close to the end of the burner-lance unit facing away from the metal melt. In this case the temperature is measured for example via a central opening in the burner-lance unit which extends along a longitudinal axis of the burner-lance unit through the latter and through which the electromagnetic radiation emitted by the metal melt can be detected.

It has been shown however that a burner-lance unit cannot readily be used in the standard operating mode described above for non-contact temperature measurement. This is because interference influences are present during burner mode as a result of the inherent radiation of the flame, which lead to incorrect measurement of the temperature T of the metal melt. During lance mode in which, in standard operation, oxygen or gas containing oxygen is injected into the furnace chamber, the oxygen is burnt exothermally in the furnace chamber, so that interference influences are also present here as a result of the combustion process, which lead to an incorrect measurement of the temperature T of the metal melt.

SUMMARY

The underlying aspect is to provide a method and a device of the type described at the start with which non-contact determination of a temperature T of a metal melt in a furnace is possible in an especially simple and precise manner.

This aspect is achieved for the method for non-contact determination of a temperature T of a metal melt in a furnace which has at least one burner-lance unit which is fed above the metal melt through the furnace wall of the furnace into a furnace chamber, by at least one temperature measurement unit arranged downstream of the at least one burner-lance unit, with the following:
  a) Operating the at least one burner-lance unit in lance mode in that a flow of gas is conveyed into the furnace chamber at supersonic speed;
  b) Blowing away slag from a surface of the metal melt by the flow of gas;
  c) Embodying the gas stream over a first period of time by a first gas in the form of oxygen or gas containing oxygen;
  d) Switching over from a first gas to a second gas in the form of inert gas while retaining the lance mode over a second period of time;
  e) Performing a permanent temperature measurement at least within the second period of time, with a measured temperature only being detected as the temperature T of the metal melt once the gas flow is in a laminar state and after, over a period of time $\Delta t$ of at least 2 seconds, the measured temperature has only fluctuated by a maximum of 1%.

This aspect is achieved for a device for non-contact determination of a temperature T of a metal melt in a furnace, especially in accordance with the method, with the device having at least one burner-lance unit which is fed above the metal melts through a furnace wall of the furnace into a furnace chamber, with the burner-lance unit having at least connections for a first gas in the form of oxygen or gas containing oxygen, for a second gas in the form of inert gas and for a combustion gas, with the device also having at least one measurement device for determining a pressure p and a flow Q of at least the second gas as well as at least one temperature measurement unit downstream from a burner-lance unit for determining the temperature T, with the device having at least one switchover device which in a lance mode makes it possible to switch from the first gas to the second gas and vice versa, and with the device includes at least one processing unit connected to the at least one temperature measuring unit and the at least one measuring unit which is configured to evaluate permanent temperature measurement in lance mode such that a measured temperature only counts as a temperature T of the metal melt after the second gas is present in a laminar state and after, over a period of time $\Delta t$ of at least 2 seconds, the measured temperature only fluctuates by a maximum of 1%.

It is only possible by a method and a device to precisely detect the temperature T of the metal melt through a burner-lance unit. The merely periodic injection of inert gas, especially of low-cost nitrogen, prevents the occurrence of interference influences which falsify the measurement of the temperature T. The consumption of inert gas compared to using a known lance is greatly reduced so that generally commercially-available storage media or tanks are sufficient for the provision of the inert gas. Such storage media only occupy an average amount of space and can readily be disposed in the vicinity of a furnace.

It has been observed that after switchover of the burner-lance unit in lance mode from the first gas which contains oxygen to the second gas which is formed from inert gas, a certain time is required for setting a laminar inert gas flow. As soon as the nominal pressure p and the nominal flow Q of the Laval nozzle of the burner-lance unit are reached, laminar flow conditions are present as a rule which have been recognized as being necessary for a trouble-free temperature measurement at the metal melt. It has been established that under laminar conditions over a certain period of time an almost constant temperature level TN is set, during which the measured temperature fluctuates by a maximum of 1%. In order to be able to detect the most precise value possible of the temperature T of the metal melt, the measured temperature is only detected as the temperature T of the metal melt if, over a period of time $\Delta t$ of at least 2 seconds, no further fluctuation of the measured temperature of more than 1% has occurred.

The pressure p and the flow Q of at least of the second gas may be detected via a measuring device present on at least one of the devices.

After operation (e) of the method there may be a switch from the second gas back to the first gas while retaining lance mode. It has namely been shown that after a specific time of injection of inert gas, the metal melt is perceptibly cooled down by the inert gas flow and the temperature level TN reached at which the temperature T can be precisely measured, is left again. Temperature measurement becomes imprecise at this point and is no longer able to be analyzed. The inert gas blown in is heated up and removed via the exhaust extraction of the furnace, which leads to an unnecessary energy loss. If the switch-off of the flow of inert gas and switchover to the first gas is too late, as a result of the loss of energy and the unnecessary use of large quantities of inert gas, the efficiency of the furnace is reduced and production costs are increased.

It has proved advantageous here for the switchover from the second gas to the first gas to occur as soon as, over a further period of time $\Delta t1$ of a maximum of 10 seconds, a drop in the temperature T of more than 1%, especially of more than 5% is detected. Thus the optimum time for switching over from the second gas to the first gas can be found in a timely manner and thus energy as well as inert gas saved and production costs lowered.

The at least one processing unit of the device may be configured so as to bring about a switchover from the second gas to the first gas by the switchover device as soon as a drop in the temperature T by more than 1%, especially more than 5%, is detectable over a further period of time $\Delta t1$ of a maximum of 10 seconds.

To carry out further temperature measurements a tried-and-tested approach has been to subsequently repeat operations (d) and (e) of the method. This enables multiple switchover is to be made between the first gas and the second gas in lance mode in order to carry out a temperature measurement a number of times for precise non-contact determination of the temperature T of the metal melt.

By a rapid switchover between the different gas flows the outlay in time for non-contact temperature measurement in lance mode can be kept as small as possible and the energy introduced into the metal melt increased.

It has proved advantageous for the first gas to be formed by oxygen and the inert gas to be formed by nitrogen. By using these gases the efficiency of the melting process and the temperature measurement is enhanced in lance mode and energy and cost savings are still made.

Depending on the geometry of the Laval nozzle of the burner-lance unit, the inert gas may enter the furnace chamber from the burner-lance unit in the direction of the metal melt at a pressure of at least 6 bar in order to generate a gas jet at supersonic speed, which exposes the surface of the metal melt for temperature measurement. The temperature radiation of the metal melt emitted by the exposed surface area is then detected by the at least one temperature measuring unit.

The at least one temperature measuring unit may be configured so as to detect a radiation emitted from the metal melt along a longitudinal axis of the burner-lance unit in the direction of the burner-lance unit. For non-contact temperature measurement a temperature measuring unit in the form of a laser, pyrometer or ondometer may be used, with the meters being able to be used alone or in combination with optical waveguides, which transfer the radiation emitted from the metal melt in the direction of the burner-lance unit to the temperature measuring unit. However the person skilled in the art is free to use further familiar devices that are suitable for non-contact temperature measurement as an alternative here.

The at least one temperature measuring unit may include a device for focusing radiation. The device for focusing temperature radiation can be embodied as a lens or lens system for example. Such a focusing device for radiation, especially temperature radiation, makes it possible for a largest possible proportion of the radiation emitted in the direction of the longitudinal axis of the burner-lance unit from the metal melt to be used for the determination of the temperature T.

The second gas may be supplied to the burner-lance unit so that it is able to be used equally well for exposing the metal melt and also for cleaning at least some parts of a focusing device. This achieves a combinational effect of the inert gas flow since the flow assumes additional functional tasks at no extra expense.

In an embodiment, a plurality of burner-lance units are connected to a temperature measuring unit, so that the temperatures T of different surface areas of the metal melt can be detected simultaneously. Through the at least one processing unit connected to the temperature measuring unit a spatial and/or temporal temperature distribution of the metal melt can be determined from the detected temperatures T. This makes it possible to obtain the most complete possible image of the temperature T of the metal melt within a metallurgical furnace. This is of great importance since the temperature distribution of the metal melt can significantly influence subsequent processes.

The determined temperature T of the metal melt can advantageously be used for control and/or regulation of a process variable for a process taking place in the furnace chamber. For example, on the basis of a temperature distribution determined, the energy input of the electrodes in an arc furnace into the metal melt can be explicitly controlled or regulated. Also for example the addition of aggregates and suchlike can be undertaken as a function of the temperature of the metal melt or of the temperature distribution of the metal melt.

The longitudinal axis of the at least one burner-lance unit may form the central axis of a channel through which the first gas and second gas are injected into the furnace chamber in lance mode. The channel may be embodied in a straight line so that the emitted radiation can propagate, likewise in a straight line, i.e. essentially without disturbance. The longitudinal axis may have an angle to the surface normal of the metal melt of 40 to 43 degrees.

A metallurgical furnace, especially an arc furnace, including at least one device as described herein, has the advantage that the temperature T and the metal melt formed therein can be detected precisely and can be employed for efficient control and/or regulation of the furnace.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
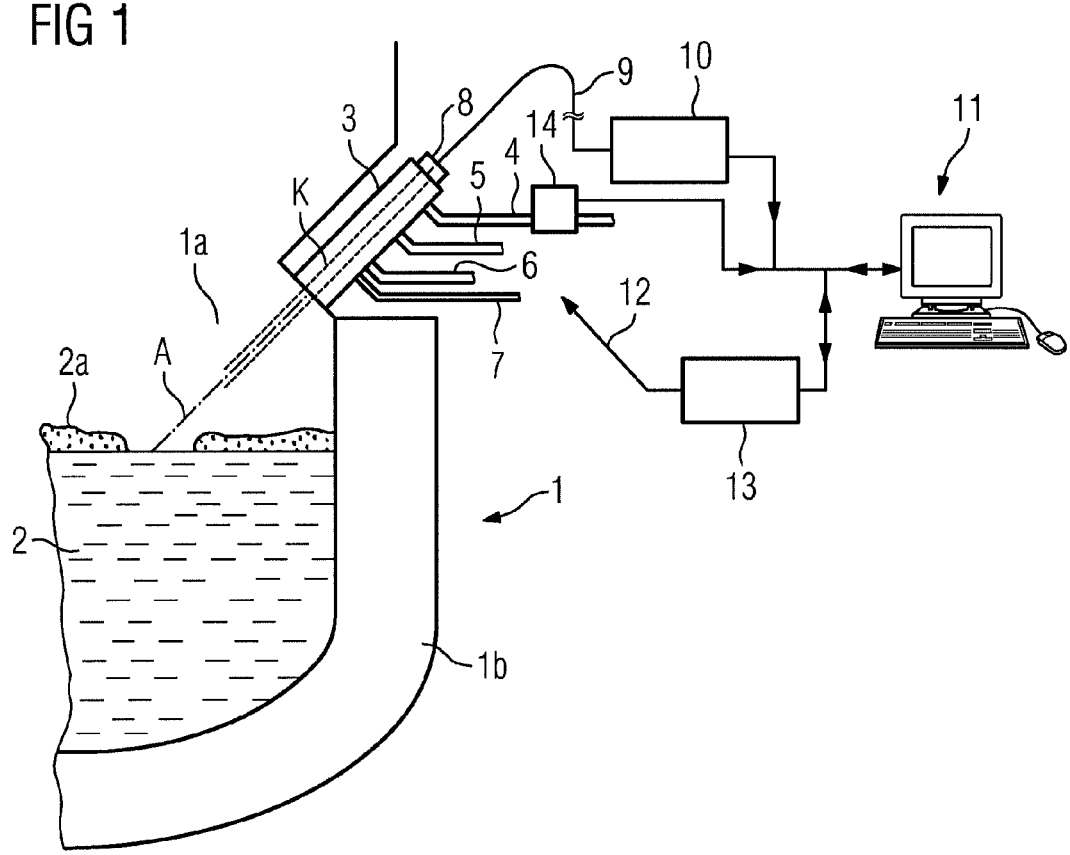
FIG. 1 is a block diagram of a metallurgical furnace with a burner-lance unit and a temperature measuring device for non-contact temperature measurement.

Reference will now be made in detail to the preferred embodiments, examples of which are illustrated in the accompanying drawings, wherein like reference numerals refer to like elements throughout.

FIG. 1 shows a section of a metallurgical furnace 1 in which a metal melt 2 is disposed. The furnace 1 is embodied here as an arc furnace with a furnace chamber 1a and a furnace wall 1b. Slag 2a has formed on the surface of the metal melt 2. A burner-lance unit 3 is installed on the furnace wall 1b above the metal melt 2 and is directed towards the surface of the metal melt 2. The burner-lance unit 3 has a channel K, through which a flow of gas is able to be conveyed in lance mode in the direction of the metal melt 2 into the furnace chamber 1a.

The burner-lance unit 3 has a number of connections, including a gas supply device 4 for supplying gas needed in lance mode, which may be injected at supersonic speed into the furnace chamber 1a. A first gas, for example, oxygen, alternating with a second gas, such as an inert gas, e.g., nitrogen, is injected via the gas supply device 4 at supersonic speed in lance mode into the furnace chamber 1a. To be able to establish when laminar flow conditions obtain in lance mode for the second gas, at least one measuring device 14, only shown schematically here, is present for detecting a pressure p and a flow Q at least for the second gas on the gas supply device 4. However the pressure p and the flow Q of the first gas can also be monitored accordingly.

At least one fuel supply device 5 and a least one combustion gas supply device 6 are also present. Fuel, such as natural gas, is supplied by a fuel supply device 5 to the burner-lance unit 3. The fuel is burnt together with combustion gas, e.g., oxygen, which is supplied by the combustion gas supply device 6.

The burner-lance unit 3 also has a cooling device 7 for supply of coolant, especially water. The burner-lance unit 3 is protected from overheating by the coolant.

On the side of the burner-lance unit 3 facing away from the furnace chamber 1a of the furnace 1a temperature measuring unit 10 is connected to the unit such that the temperature is able to be measured in the furnace chamber 1a. The channel K of the burner-lance unit 3 preferably has a longitudinal axis A. Starting from the hot furnace chamber 1a, electromagnetic radiation, especially temperature or infrared radiation, can propagate along the longitudinal axis A and thus arrives in the channel K of the burner-lance unit 3. From the channel K the radiation here reaches a focusing device 8, for example a lens system, which focuses the radiation and—as in the present exemplary embodiment— couples it into an optical waveguide 9. By the optical waveguide 9 the radiation is supplied to the temperature measurement unit 10 which determines from the coupled-in radiation an associated temperature. This can for example be done by the temperature measuring unit 10 which is present in the form of a pyrometer.

The temperature measuring unit 10 is preferably embodied such that this unit can determine the different spectral components of the radiation, especially of the infrared radiation. This significantly reduces errors in temperature detection. This can be achieved by the quotient pyrometer, which is also referred to as a ratio pyrometer or two-color pyrometer. Other suitable temperature measuring units 10 with appropriate measurement accuracy can also be used.

Since the temperature measuring unit 10 is connected here to the burner-lance unit 3 by the optical waveguide 9 and the focusing device 8, the temperature measuring unit 10 does not have to be located in the immediate vicinity of the burner-lance unit 3. The temperature measuring unit 10 can also be connected in the same way to further burner-lance units which are disposed on the furnace 1. However the optical waveguide 9 can also be dispensed with if a temperature measuring unit connects directly to the focusing device 8 or to the end of the burner-lance unit 3 facing away from the furnace chamber 1a.

A regulating device 13 is present which, on the basis of at least one regulating signal, regulates the supply of fuel and combustion gas in burner mode and also the supply of a gas jet in lance mode and the switchover between the first gas and the second gas. For this purpose a switchover device, in the form of a valve arrangement for example, not shown in detail here, is activated by the regulating device 13, which undertakes the switchover between the first gas and the second gas that the gas supply device 4.

Furthermore a processing unit 11 is present, which is connected to the temperature measuring unit 10 and is configured to analyze the measured temperature and to select from the set of obtained temperature values those values which precisely specify the temperature T of the metal melt. To this end the progress for on the one hand the pressure p and on the other hand the flow Q detected by the at least one measuring device 14, at least for the second gas, is transferred to the processing unit 11.

Regulation interventions can be undertaken by the regulating device 13, which bring about the switching on or switching off of burner mode, a change in the supplied amounts for fuel and/or combustion gas, the beginning of a charging process, the starting of lance mode and/or the selection and amount of the gas injected in lance mode, if necessary as well as a change in the current feed to the electrodes of the arc furnace 1, a change in the position of the electrodes of the arc furnace 1 etc. This is shown in FIG. 1 by an arrow 12 pointing to the left from the regulating device 13.

Lance mode may be started when the material to be melted in the furnace chamber 1a is present entirely as melt. The slag 2a, which has formed on the metal melt 2, is removed locally or blown away by the gas jet which flows out at supersonic speed in lance mode from the burner-lance unit 3. Thus the surface of the metal melt 2 is exposed for non-contact temperature detection and the temperature of the metal melt 2 in the furnace chamber 1a can be detected by the temperature measuring unit 10 or another detector.

Figure 2:
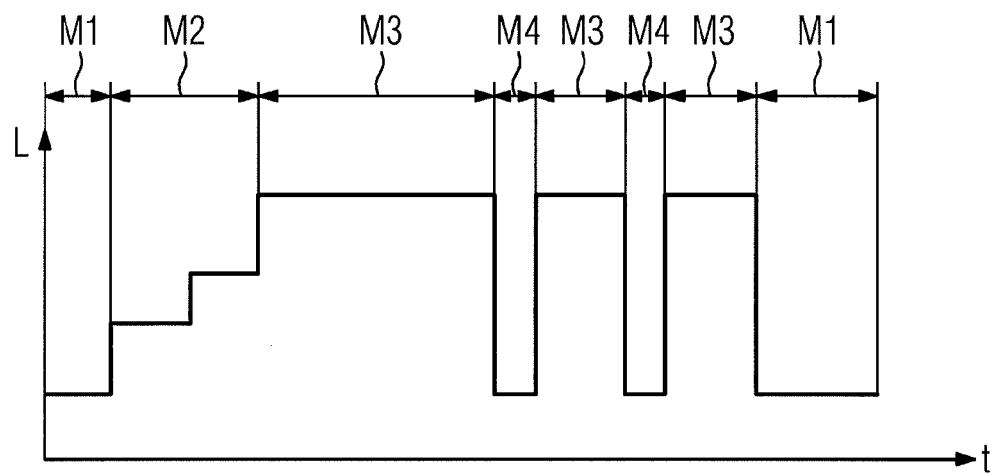
FIG. 2 is a graph of the sequence of a melting process with temperature measurement according to the method.

FIG. 2 shows schematically the progress of the melting process in a metallurgical furnace. The power L of a burner-lance unit of a furnace is plotted here over the time t. In a first phase M1 the furnace is charged, i.e. material to be melted is introduced into the furnace chamber of the furnace. During this first phase M1 the burner-lance unit is operated with a protective flame.

In a second phase M2 the burner-lance unit is operated in burner mode and the power L is increased in stages. At the end of the second phase M2 a metal melt which is covered with slag is present in the furnace chamber.

In a subsequent third phase M3 the burner-lance unit is switched over to lance mode, with the first gas, especially in the form of oxygen, being injected at supersonic speed into the furnace chamber. To enable the temperature T of the metal melt to be determined precisely, in a fourth phase M4 the first gas is replaced by a second gas, especially in the form of nitrogen. Lance mode is maintained during this operation. The temperature of the surface of the metal melt exposed by the gas jet of the second gas is now measured permanently. However the measured values are only detected as the temperature T of the metal melt once the gas flow of the second gas is in a laminar state and after, over a period of $\Delta t$ of at least 2 seconds, only fluctuations of the measured temperature of maximum 1% have been detected.

As soon as the second gas causes a significant cooling down of the metal melt, a switch is made back to the first gas and the third phase M3 is repeated. Changing between the third phase M3 and the fourth phase M4 makes a precise detection of the temperature T of the metal melt with simultaneous efficient introduction of energy into the metal melt possible. In accordance with FIG. 2 there are two switchovers in lance mode, for example from the first gas to the second gas and back again, wherein in each fourth phase M4 the temperature T of the metal melt can be detected precisely. A switch between third phase M3 and fourth phase M4 can however occur any number of times. Subsequently the metal melt is tapped while the burner-lance unit, as in the first phase M1, is operated with a protective flame, and a new melting process takes place with renewed charging of the furnace chamber.

Figure 3:
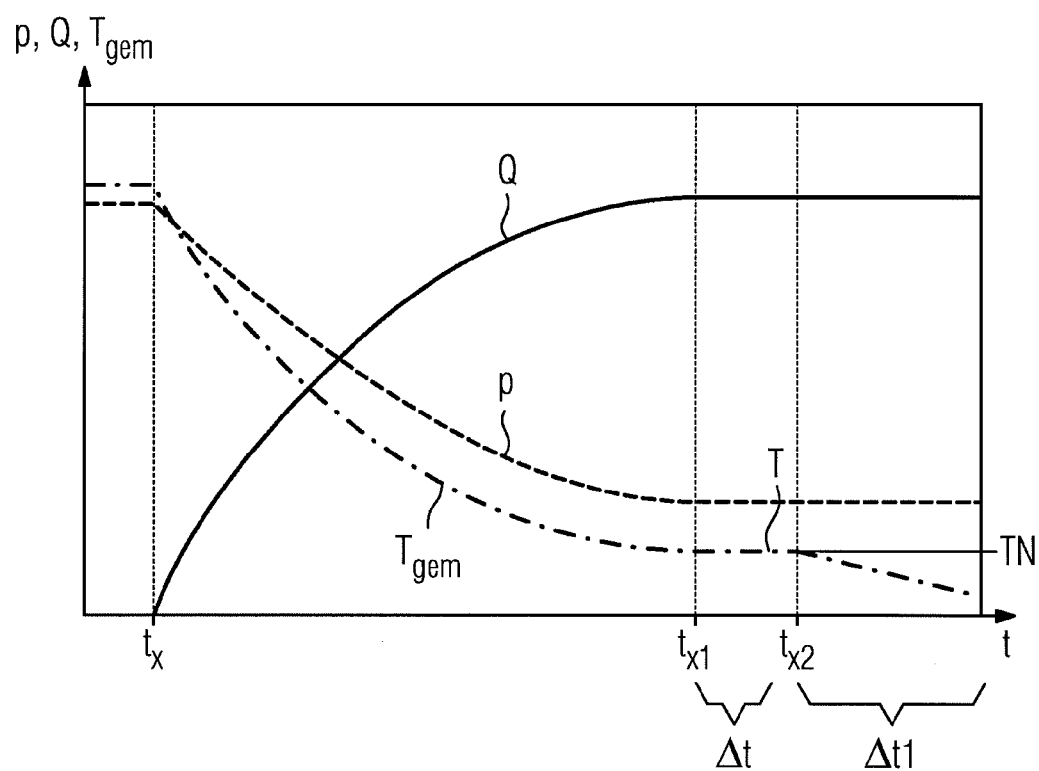
FIG. 3 is a graph of the determination of the optimum time for measuring the temperature T of the metal melts and the optimum switchover time from the second gas back to the first gas in the lance mode.

FIG. 3 shows a schematic diagram for determining the optimum time for measuring the temperature T of the metal melt and of the optimum switchover point from the second gas back to the first gas in lance mode. The diagram shows the curves of the pressure p of the second gas in lance mode plotted over the time t, the curve of the flow Q of the second gas in lance mode, as well as the permanent temperature Tgem measured in lance mode by a temperature measuring unit. At a point in time $t_x$ there is a switchover in lance mode from the first gas, e.g., oxygen, to the second gas, e.g., nitrogen. In respect of FIG. 2, a switch is made from a third phase M3 into a fourth phase M4 at point in time $t_x$. The flow Q of the second gas through the burner-lance unit increases up to a nominal flow Q and the pressure p of the second gas falls to a nominal pressure p so that at a point in time $t_{x1}$ the gas flow of second gas is present under laminar flow conditions.

The measured temperature Tgem now reaches a temperature level TN and hardly fluctuates any more. If under the laminar flow conditions over a period of time $\Delta t$ of at least 2 seconds only fluctuations of the measured temperature of a maximum 1% are detected, the measured temperature Tgem is set to the temperature T of the metal melt and this temperature is stored. To analyze the values measured by the at least one measuring unit of the flow Q of the pressure p and of the temperature Tgem measured by the at least one temperature measuring unit, at least one processing unit is used to determine the temperature T of the metal melt, to which the values are transferred and which performs the necessary calculations.

Provided the temperature level TN remain stable and the measured temperature Tgem does not fluctuate by more than 1%, the temperature T can continue to be detected. However as soon as a significant fall in the measured temperature Tgem from the temperature level TN is able to be recognized which is the result of a cooling off of the metal melt by the gas jet made up of second gas, a switch back to the first gas again is made in lance mode. In respect of FIG. 2 this would be equivalent with a switchover from a fourth phase M4 into a third phase M3. A theoretically optimum time $t_{x2}$ for a switchover from the second to the first gas in lance mode is able to be seen in FIG. 3. If over a further period of time $\Delta t1$ of maximum 10 seconds a fall in the temperature T by more than 1%, especially of more than 5%, compared to the temperature level TN is detected, there is an immediate switchover and the first gas is blown into the furnace chamber again.

The method and the device can be readily transferred by the person skilled in the art to metallurgical furnaces with other burner-lance unit arrangements, a number of burner-lance units or geometrically differently designed furnaces, without departing from the spirit and scope of the claims.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for non-contact determination of temperature of a metal melt in a furnace having at least one burner-lance unit which is fed above the metal melt through a furnace wall of the furnace into a furnace chamber, by at least one temperature measuring unit downstream from the at least one burner-lance unit, comprising:
    operating the at least one burner-lance unit in lance mode to convey a flow of at least one gas into the furnace chamber at supersonic speed;
    blowing away slag from a surface of the metal melt by the flow of the at least one gas;
    embodying the flow of the at least one gas over a first period of time by a first gas including oxygen;
    switching from the first gas to a second gas that is inert, while retaining the lance mode over a second period of time;
    permanently obtaining a metal melt temperature, at least within the second period of time, by detecting an obtained temperature of the metal melt; and
    accepting the obtained temperature as a valid measurement of the metal melt temperature when the gas flow is in a laminar state and after the obtained temperature has fluctuated by a maximum of 1% over a third period of at least 2 seconds.

2. The method as claimed in claim 1, further comprising changing from the second gas to the first gas, after said obtaining the metal melt temperature, while maintaining the lance mode.

3. The method as claimed in claim 2, wherein said changing from the second gas to the first gas occurs when, over a second period of a maximum of 10 seconds, a fall in the obtained temperature by more than 1% is detected.

4. The method as claimed in claim 3, wherein changing from the second gas to the first gas occurs as soon a fall in the obtained temperature by more than 5% is detected over the second period.

5. The method as claimed in claim 1, further comprising repeating said switching and said obtaining.

6. The method as claimed in claim 1, further comprising detecting, by the at least one temperature measuring unit, a radiation emitted along a longitudinal axis of the burner-lance unit in the direction of the burner-lance unit.

7. The method as claimed in claim 1, further comprising at least one of controlling and regulating a process variable for a process executing in the furnace chamber, using the metal melt temperature.

8. The method as claimed in claim 1, wherein the first gas is oxygen and the second gas is nitrogen.

* * * * *